United States Patent [19]

Sladky

[11] Patent Number: 4,488,571
[45] Date of Patent: Dec. 18, 1984

[54] FLOW-CONTROL SYSTEM WITH PRESSURE-RESPONSIVE VALVE

[76] Inventor: Hans H. Sladky, Fabriciusstrasse 16, 2000 Hamburg 71, Fed. Rep. of Germany

[21] Appl. No.: 477,825

[22] Filed: Mar. 22, 1983

Related U.S. Application Data

[63] Continuation-in-part of Ser. No. 403,707, Jul. 30, 1982.

[51] Int. Cl.³ .................... F16K 43/00; F16K 31/26
[52] U.S. Cl. ...................... 137/315; 137/414; 137/415; 137/426; 137/445; 137/494; 137/625.33; 137/454.2; 251/360
[58] Field of Search ........ 137/315, 413, 454.2, 137/415, 414, 426, 434, 445, 625.33, 494, 505.27, 505.28, 505.13, 505.22, 442; 251/360

[56] References Cited

U.S. PATENT DOCUMENTS

| | | | |
|---|---|---|---|
| 967,845 | 8/1910 | Siegrist | 137/413 |
| 1,354,311 | 9/1920 | Landrum | 137/445 |
| 1,871,044 | 8/1932 | Crosthwait, Jr. et al. | 137/414 |
| 2,098,696 | 11/1937 | Sparrow | 137/414 X |
| 2,558,471 | 6/1951 | Whitlock, Jr. | 137/445 |
| 2,640,498 | 6/1953 | Bissell | 137/625.33 |
| 2,735,442 | 2/1956 | Kenney | 137/413 |
| 2,827,260 | 3/1958 | Jordan | 137/625.33 |
| 3,004,748 | 10/1961 | Sprouse et al. | 137/426 |
| 3,159,177 | 12/1964 | Hott, Jr. | 137/494 |
| 3,474,818 | 10/1969 | Hartman | 137/315 |
| 3,587,627 | 6/1971 | Gilmore | 137/445 |
| 3,707,987 | 1/1973 | Gordon | 137/543.23 |
| 4,304,254 | 12/1981 | O'Connell | 137/315 |
| 4,307,747 | 12/1981 | Carpentier | 137/315 |

FOREIGN PATENT DOCUMENTS 495248 1/1978 Australia .................. 137/625.3

OTHER PUBLICATIONS

Parker Hannifin Corporation of Broadview, IL, Bulletin No. R/S 11582.

Primary Examiner—George L. Walton
Attorney, Agent, or Firm—Karl F. Ross; Herbert Dubno

[57] ABSTRACT

A flow-regulating valve, with a body forming a flow channel between an entrance port and an exit port, has a shutter in the form of an apertured backing plate and an apertured slide which adjoin each other along a plane inclined or parallel to the axis of at least one of these ports so as to be accessible, for inspection or repair, through a neck with an opening offset from both ports but normally closed by a cover. The ports can therefore be formed by nipples rigid with the valve body, e.g. welded thereto, not requiring disconnection from their conduits. The slide is shiftable by a rod extending parallel to the aforementioned plane, specifically horizontally when the valve is controlled by a float in an adjoining tank. In order to isolate the interior of the tank from the flow channel during repairs, a thruster in the tank can be manually operated from the outside to move the rod into a limiting position in which the passage traversed by that rod is plugged.

18 Claims, 8 Drawing Figures

FLOW-CONTROL SYSTEM WITH PRESSURE-RESPONSIVE VALVE

CROSS-REFERENCE TO RELATED APPLICATION

This is a continuation-in-part of my copending application Ser. No. 403,707 filed July 30, 1982.

FIELD OF THE INVENTION

My present invention relates to a flow-control system in which a valve normally blocking the passage of a fluid is movable into an unblocking position in response to changes in pressure or in some other parameter of the controlled or possibly another fluid.

BACKGROUND OF THE INVENTION

The art today knows fluid-regulating valves which can be shifted by small pneumatic, hydraulic or mechanical forces acting upon a shutter mechanism, thanks to the use of two relatively slidable plates with multiple apertures—usually designed as slits—that are mutually offset in a blocking position and are mutually aligned in an unblocking position. These sensitive valves, therefore, can be used either for direct flow regulation or as pilot valves for the control of associated flow-regulating valves. The precise design of their operating elements, however, makes them susceptible to various factors which may impair their function, among them possible blockages of fluid passages and inaccurate guidance of connecting members. When, for example, the valve body or housing includes a compartment bounded by a membrane or other resiliently biased member displaceable by fluid under pressure, that compartment ought to have a calibrated bleeding hole whose cross-sectional area determines the pressure required for opening or closing the valve. Such a bleeding hole is usually of rather small diameter and is therefore liable to become clogged by impurities or, if the controlling fluid is a hardenable liquid, by a residue of that liquid when the influx thereof has ceased.

In the case of a pilot valve controlled by a float measuring the level of a pool of liquid, e.g. in a tank intermittently fed with fresh liquid by way of that valve, the movement of the float is nonlinear when its support consists of a lever fulcrumed on the valve housing. The translation of the swing of that lever into a linear motion of a sliding shutter also creates problems which heretofore have made it difficult to utilize valves of the aforementioned sensitive type for this purpose. Moreover, when the connection between the float lever and the shutter includes a rod traversing adjoining walls of the tank and of the valve housing, it will be necessary to prevent leakage of liquid or of its vapors (e.g. when a volatile fluid such as a refrigerant is involved) into the valve housing when the latter must be opened for making its shutter mechanism accessible to an operator. The use of O-rings or similar sealing elements in the passage traversed by the rod should be avoided since their friction would reduce the efficiency of these sensitive valves; furthermore, a fluidtight seal will not be needed in normal operation when the fluid circulates in a closed system and the rod is disposed sufficiently above the highest liquid level in the tank. Conventional wisdom would dictate a way out of this difficulty by a draining of the system before an inspection or repair is to be carried out; this, however, is a rather inconvenient solution.

The need for such inspection or repair may also arise, with valves of this rather delicate nature, in systems in which the shifting of the slidable valve plate is controlled by means other than a float, e.g. by the aforementioned membrane. When the contact plane of the valve plates is perpendicular to a common axis of the entrance and exit ports lying on opposite sides of the shutter assembly, as shown in my above-identified copending application, access to the shutter can be had only through the port confronting same which therefore must be detachable from the associated conduit. In valves with shutter members displaceable against the flow direction for unblocking the fluid path, such as those marketed by Parker Hannifin Corporation of Broadview, Illinois, it is known (see their brochure titled Bulletin No. R/S 11582) to provide the valve housing with a neck having an axis inclined to that of the aligned ports at an acute angle and to close that neck with a lid in which an actuating rod is manually displaceable; a removal of the lid will provide access to the shutter but will also disconnect it from its actuating mechanism so that its operation under near-normal conditions could not be observed.

OBJECTS OF THE INVENTION

The general object of my present invention, therefore, is to provide a highly effective valve for pilot or flow-regulating purposes.

A more particular object is to provide means in a flow-regulating valve for preventing possible clogging of a bleeding hole communicating with a pressure compartment.

Another specific object of my invention is to provide means in a float-controlled valve for connecting a lever with a sliding shutter in a manner obviating the generation of undesirable force components.

A further object of my invention is to provide means for facilitating the access to the shutter mechanism of a high-precision valve of the type referred to.

Still another object is to solve the problem of sealing the housing of a float-controlled valve of this type against the adjoining tank, for allowing the shutter to be accessed, in a manner avoiding the need for draining the system.

SUMMARY OF THE INVENTION

According to one aspect of my invention, a channel interconnecting an entrance port and an exit port in the body of a flow-regulating valve includes flow-control means movable between a blocking and an unblocking position with the aid of a rod extending to a resiliently biased member bounding a pressure compartment communicating with a control port. The biased member, advantageously designed as a spring-loaded membrane, is repressible against its biasing force by fluid under pressure admitted via the control port into the compartment adjoining this member. That compartment communicates with the blockable channel, downstream of the flow-control means, by way of a restricted passage which is traversed with limited clearance by the connecting rod so as to enable a throttled escape of fluid from the pressure compartment to the exit port. Thanks to the motion imparted to the connecting rod by the resiliently biased member during opening and closure of the valve, any foreign matter tending to clog the small clearance will be dislodged so that pressure fluid can escape at a predetermined rate in the unblocking position of the shutter means.

When the tendency to clog is particularly high, as where the fluid to be controlled is a hardenable liquid, it may be desirable to obstruct that clearance in the blocking position so that pressure sufficient to open the valve may be built up rapidly in the compartment bounded by the membrane or other resiliently biased member. In such a case I prefer to provide the connecting rod with a plug sealing off that clearance under the biasing force in the absence of countervailing fluid pressure, the plug advantageously coming to rest on an end of a calibrated bushing spacedly surrounding the rod to define the aforementioned clearance.

In a reversal of the arrangement referred to, the pressure compartment communicates with the blockable channel on the upstream side of the flow-control means from which fluid enters that compartment in both shutter positions through the restricted passage surrounding the connecting rod. As long as the compartment is vented through the control port, the valve stays open; when the outflow through that port is cut off, e.g. through an ancillary valve, the connecting rod is shifted into the blocking position.

In an improved valve structure according to my invention, the plane of motion of a shutter member linked with the aforementioned connecting rod—specifically the contact plane of the two relatively slidable apertured plates in a sensitive valve of the above-described kind—includes an angle significantly different from 90°, possibly zero, with the axis of at least one of the housing ports forming part of the flow channel, preferably its entrance port. The restricted passage traversed by the connecting rod extends parallel to that plane, from a location in the flow channel lying on one side of the shutter, to a remote space provided with control means such as a membrane responsive to fluid pressure or a float in a partly liquid-filled tank; on the side opposite that location, the shutter confronts an access opening of the valve body normally sealed by a removable cover.

The access opening will generally be formed by a tubular neck rising from the valve body with an axis substantially perpendicular to the connecting rod. When the two main ports are in line with each other, this axis and the rod advantageously include with the channel axis an angle of about 45° which, however, could vary within a range of approximately 30° to 60°. The neck may also be the site of an outlet from which a bypass path extends via an ancillary valve—e.g. one of the float-controlled type—to a further port that opens into a pressure compartment bounded by a membrane linked with the connecting rod. The valve body may therefore be designed as a housing with nipples forming the entrance and exit ports which are welded to that housing and can also be permanently connected—as by welding—with external conduits.

According to another aspect of my invention, applicable to a float-controlled valve, a shutter horizontally slidable in the valve housing is coupled by a double-jointed link with a float-supporting lever fulcrumed on that housing. Such a link transmits only the horizontal component of the lever motion without generating any significant bending stresses in the shutter mechanism. The lever is preferably elbow-shaped with a substantially vertical arm articulated to the double-jointed link and a substantially horizontal arm rigidly connected with the float.

Pursuant to a further feature of this invention, I provide the tank surrounding the float with setting means operable from the outside for displacing the connecting rod into a limiting position in which a formation on that rod obstructs the passage linking the interior of the tank with that of the valve body or housing. The setting means may comprise a manually repressible thrust member which preferably coacts with the lever referred to above and moves on a line skew to the horizontal pivotal axis of that lever; the thrust member, advantageously, is normally immobilized so as to define another limiting position for the rod and for the shutter slide positively coupled therewith, thus eliminating the need for stop screws as disclosed in my copending application.

BRIEF DESCRIPTION OF THE DRAWING

The above and other features of my invention will now be described in detail with reference to the accompanying drawing in which.

SPECIFIC DESCRIPTION

Figure 1:
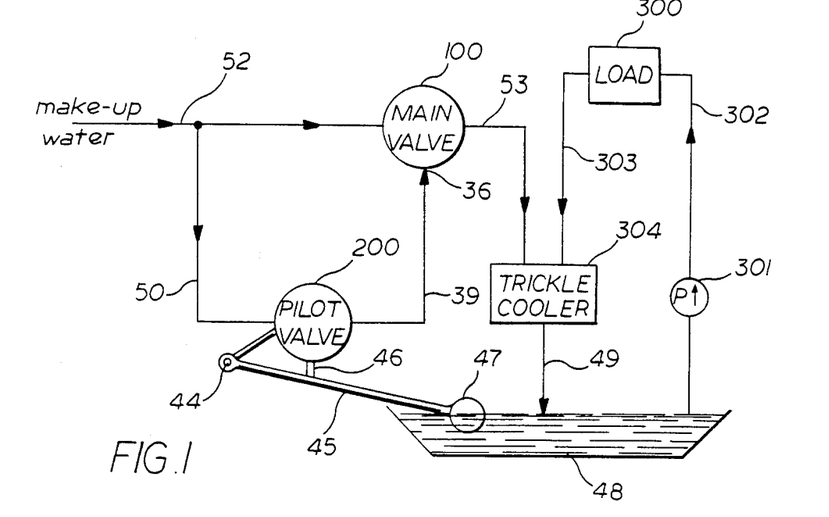
FIG. 1 is a diagrammatic view of a flow-control system according to my invention, including a main flow-regulating valve and an associated pilot valve.

In FIG. 1, by way of example, I have shown a main valve 100 and a pilot valve 200 included in a system designed to supply water at near-freezing temperature to a load 300, the water being circulated to the load by a pump 301 via an ascending conduit 302, a descending conduit 303 and a trickle cooler 304 through which the recirculated water—heated in the load to, say, 10° C.—is fed back via a pipe 49 to a pool in a tank 48 where the average water temperature is to be slightly above 0° C. Since water is unavoidably lost during circulation, make-up water must be supplied from time to time via a conduit 52 in order to maintain the liquid in the pool at a predetermined average level. A float 47 dipping into the liquid in tank 48 is supported by a lever 45 which has an extension 46 controlling the pilot valve 200 as more fully described hereinafter with reference to FIG. 5. The lever is swingable about a horizontal pivot axis at a fulcrum 44 on the housing of the valve 200. A branch 50 of conduit 52 enters ancillary valve 200 from which an extension 39 of that branch leads to a control inlet 36 of main valve 100.

As long as the liquid level in tank 48 is high enough, both valves 100 and 200 are closed. When the water drops below the designated level, float 47 causes lever 45 to open the pilot valve 200 whereby incoming water at supply pressure reaches the control inlet 36 of valve 100; the latter thereupon unblocks the connection between conduits 52 and 53 to feed make-up water by way of trickle cooler 304 to the pool in tank 48 until the flow through pilot valve 200 is cut off by the float 47. As will be readily apparent, the delay caused by the passage of the make-up water through trickle cooler 304 introduces a certain hysteresis in the operation of the system. Thus, water will continue to accumulate for a while in reservoir 48 after the reclosure of both valves and a certain time will elapse until they have to be opened again.

Figure 2:
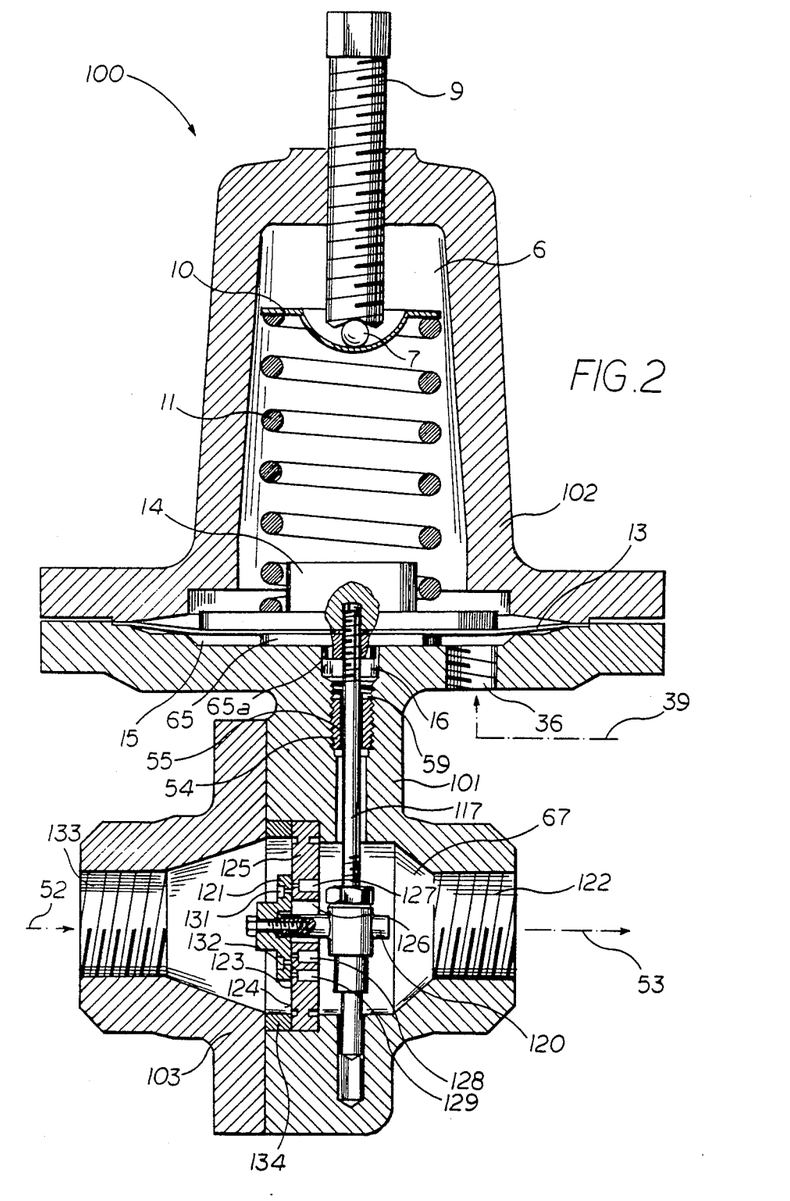
FIG. 2 is a longitudinal sectional view of the main valve of FIG. 1, shown in a flow-blocking position and drawn to a larger scale.

Reference will now be made to FIG. 2 showing details of the structure of flow-regulating valve 100. This valve comprises a housing formed from a lower body 101 and an upper body 102 as well as a cover 103 whose flange is bolted to body 101 and which forms an entrance port 133 connected to the supply line 52. An exit port 122, formed by body 101 and connected to outgoing line 53, is coaxial with port 122 and is separated therefrom by a shutter assembly including a sliding plate 121 and a fixed plate 125, the plate 125 extending completely across a channel 67 existing between ports 122 and 133. Plate 125, clamped between body 101 and cover 103 by a spacing ring 134, has a contact surface 124 confronting the slide 121 and is provided with three slits 127, 128, 129 extending parallel to one another in a direction perpendicular to the plane of FIG. 2. Surface 124 of plate 125 is in contact with a surface 123 of slide 121, that slide having two slits 131, 132 which in the valve-open position of FIG. 3 respectively register with slits 127 and 128. The third slit 129 of plate 125 is unobstructed in this position but will be closed by a slight downward shift of slide 121 which also disaligns the reduced extremities of slits 131 and 132 from those of slits 127 and 128; upon such disalignment, as shown in FIG. 2, the flow path from port 133 to port 122 is completely blocked.

Slide 121 is secured to a pin 120 which traverses a guide slot 126 of plate 125 and is fastened to the lower end of a connecting rod 117 whose upper end is threaded into a disk 14 overlying a flexible membrane 13 clamped between housing parts 101 and 102. Disk 14 serves as an anchor for a coil spring 11 which is received in a chamber 6 formed by a dome-shaped portion of body 102; another spring anchor is formed by a dished plate 10 abutting an adjusting screw 9 which is threaded into the top wall of chamber 6 and bears upon the plate 10 through a ball 7.

Membrane 13 defines with body 101 a pressure compartment 15 of variable volume opening into a threaded vertical bore 16 as well as into the control inlet 36 already referred to. A smaller disk 65, secured to the underside of the membrane opposite spring anchor 14, has a neck 65a received with clearance in the upper part of bore 16. Seated in this bore is a threaded bushing 54 which is calibrated to surround the rod 117 with a small annular clearance 55 serving as a bleeder aperture for compartment 15 whereby pressure fluid admitted via inlet 36 into that compartment can leak off into exit port 122 through a part of channel 67 downstream of shutter assembly 121–125. Bushing 54 has notches 59 facilitating its screwing into the threaded bore 16.

As long as no fluid under pressure is delivered to inlet 36 through the bypass line 39 controlled by pilot valve 200, as shown in FIG. 1, the pressure of spring 11 acting upon membrane 13 holds the valve 100 in the closed position illustrated in FIG. 2. If any solids should accumulate in clearance 55 during such closure, they will be quickly dislodged when the reapplication of pressure to compartment 15 raises the membrane and elevates the connecting rod 117 along with slide 121 to re-establish communication between ports 133 and 122. As further shown in FIG. 3, where conduit 39 is seen to be branched off the supply line 52 at a lateral aperture 68, the float-controlled pilot valve 200 of FIG. 1 could be replaced in some instances by a different flow controller 200′, e.g. a manually operated shut-off valve.

Figure 3:
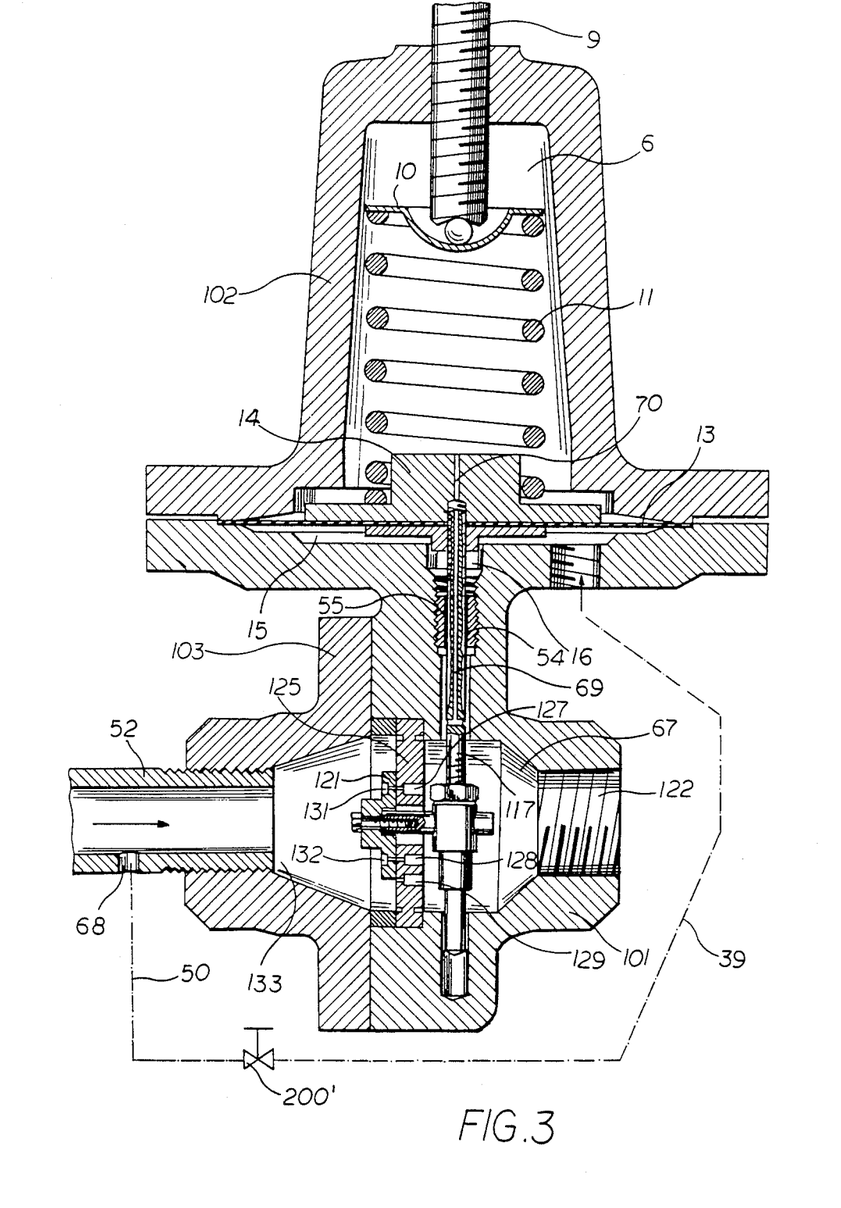
FIG. 3 is a sectional view of part of the valve of FIG. 2 in an unblocking position, showing a modification.

FIG. 3 further shows a bore 69 passing axially through connecting rod 117 and opening at its lower end into the channel 67, the upper end of bore 69 communicating via a bore 70 in disk 14 with the spring chamber 6. Such a connection between chamber 6 and exit port 122 serves to maintain outlet pressure in that chamber when the latter is not otherwise vented to the atmosphere.

Figure 4:
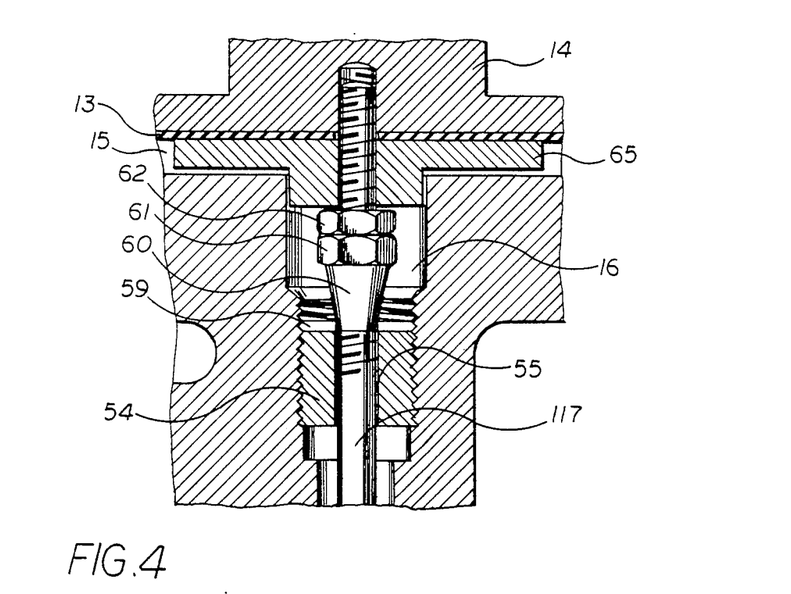
FIG. 4 is a view similar to that of FIG. 2, illustrating another modification.

In FIG. 4 I have shown the connecting rod 117 provided with a frustoconical plug 60 having a head 61 engaged by a locking nut 62. In this instance, the closure or blocking position of the valve is determined by the plug 60 coming to rest on the slightly flared upper end of bushing 54 whereas disk 65 underlying the membrane 13 remains spaced above the bottom of compartment 15, unlike the arrangement of the preceding Figures where the disk abuts that bottom in the closure position (see FIG. 2). As a result, pressure fluid entering the compartment 15 through inlet 36 (FIGS. 2 and 3) will be able to act upon the entire underside of membrane 13 while still being prevented from escaping through clearance 55 as long as the valve is closed. There is thus available a larger force to overcome the inertia of the mobile masses and the initial frictional resistance between sliding surfaces 123 and 124 of plates 121 and 125 which is relatively high at this stage since the full supply pressure of the fluid in conduit 52 bears upon the shutter assembly. Some resistance may also be encountered by the rod 117 within bushing 54, especially in the case of a nonaqueous working liquid liable to leave a hardened residue in clearance 55. As soon as the membrane 13 begins to lift, such resistance will be broken and clearance 55 will again communicate with compartment 15 to establish an escape path for the pressure fluid in that compartment; at the same time the friction between plates 121 and 125 will be reduced as the pressure at entrance port 133 is relieved by the opening of the shutter.

Figure 5:
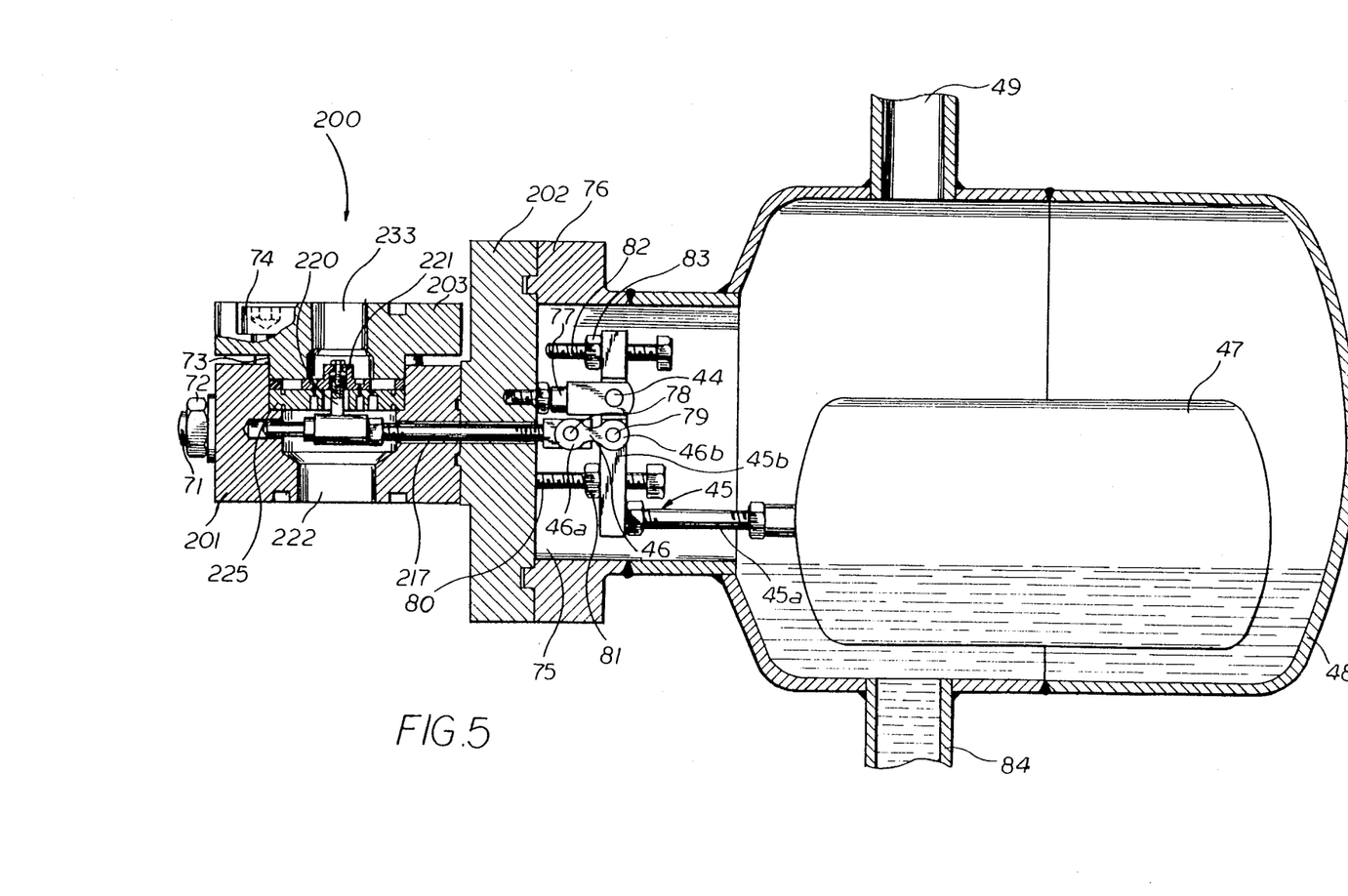
FIG. 5 is a sectional view, also drawn to a larger scale, of the pilot valve of FIG. 1 and an associated float.

I shall now refer to FIG. 5 for a more detailed description of the pilot valve 200 shown in FIG. 1. That valve has a structure generally similar to that of flow-regulating valve 100, with its housing comprising two parts 201, 202 as well as a cover 203 forming an inlet port 233 opposite an outlet port 222; unlike bodies 101 and 102, however, parts 201 and 202 adjoin each other along a vertical surface. A shutter assembly between ports 222, 233 comprises again a stationary plate 225 adjoining a movable plate 221, the two plates being apertured in the same manner as plates 121 and 125 of FIGS. 2 and 3. Slide 221 is secured to a pin 220 which traverses a guide slot of plate 225 and is fastened to a connecting rod 217 extending into housing part 202. The two housing parts 201 and 202 are interconnected by bolts 71 and nuts 72; cover 203 is secured to body 201 by bolts 73 with heads 74.

Rod 217, which together with pin 220 and plate 221 slides horizontally rather than vertically as do their counterparts in valve 100, extends into a chamber 75 surrounded by a flange 76 of a tank 48 which corresponds to the reservoir so designated in FIG. 1. The pool of liquid in that tank supports the aforedescribed float 47 which is rigid with a horizontal arm 45a of its supporting lever 45, the latter being elbow-shaped and provided with a vertical arm 45b which is swingable within chamber 75 about a horizontal pivot pin constituting the fulcrum 44 and spanning a bifurcate extremity of a bolt 77 screwed into housing part 202. The lever extension 46 schematically indicated in FIG. 1 is here shown as a double-jointed link with two eyes 46a, 46b respectively articulated to rod 217 and arm 45b by pintles 78, 79. Link 46 lies substantially in line with rod 217, its pivot 79 being close to the fulcrum 44 of lever 45 so as to require a significant rise or fall of float 47 in order to shift the shutter plate 221 from its illustrated unblocking position into its blocking position or vice versa. The swing of lever 45, and thus the shift of slide 221, is limited by a pair of abutments, namely a bolt 80 threaded into a lower part of arm 45b while being secured in position by a nut 81 and a bolt 82 threaded into the free end of arm 45b where it is held in position by a nut 83. In the illustrated unblocking position of valve 200, brought about by a low liquid level in tank 48, bolt 80 bears upon the outer surface of housing part 202 to prevent any further clockwise swing of lever 45. When the water level rises, the lever swings counterclockwise until bolt 82 abuts the same housing wall to establish the blocking position of the valve. FIG. 5 also shows the pipe 49, through which water from trickle cooler 304 (FIG. 1) is fed into tank 48, as well as a drain 84 through which the tank can be emptied or placed in communication with a larger body of water.

It will be noted that the effective length of link 46—measured between pintles 78 and 79—is many times greater than the stroke of rod 217 limited by stops 80 and 82. This link, therefore, remains substantially horizontal in both limiting positions so as to move virtually codirectionally with the rod. Thus, no significant bending or shear stresses are imparted to rod 217 or to the shutter mechanism controlled thereby. The link 46 could be modified in various ways, as by providing it with spherically curved extremities forming part of a pair of universal joints to replace the hinges constituted by eyes 46a, 46b and pintles 78, 79.

In any event, the point of articulation of lever 45 with link 46 could also be located at the opposite side of fulcrum 44, i.e. at the free end of arm 45b, with reversal of the shutter assembly 221-225 and suitable foreshortening of arm 45b to keep the link 46 in line with the rod 217.

The use of substantially identical shutter assemblies in main valve 100 and pilot valve 200 is advantageous from a manufacturing viewpoint and also insures high-precision operation of both valves.

Figure 6:
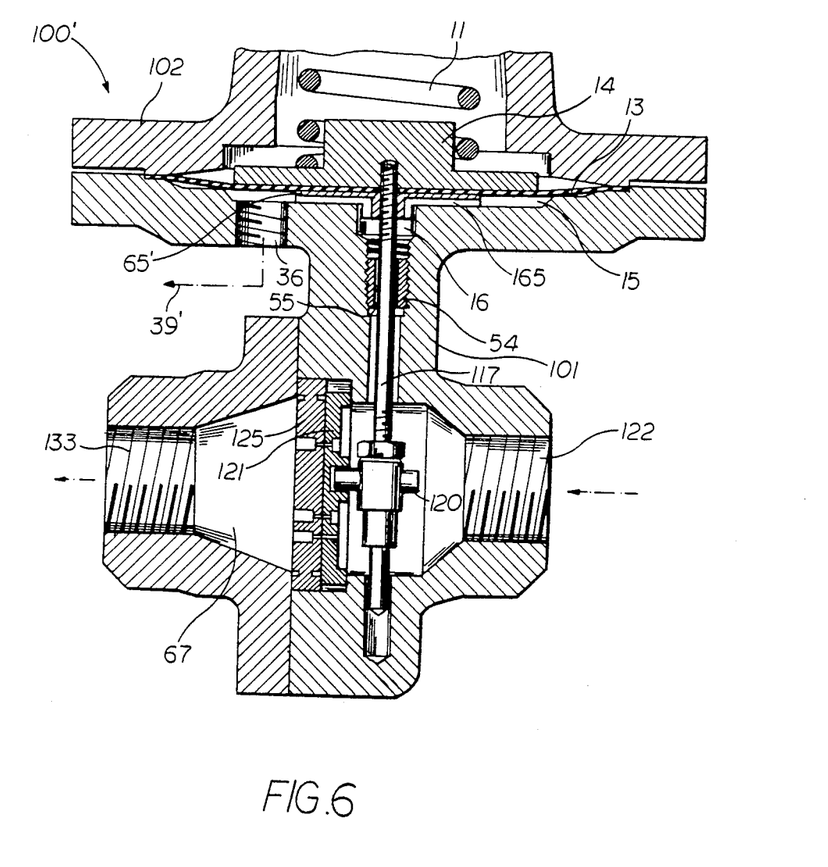
FIG. 6 is another view similar to that of FIG. 2, showing a further modification.

In FIG. 6 I have shown a valve 100' whose structure is an inversion of that of FIG. 2, with fluid under pressure entering at port 122 and leaving at port 133 in the illustrated shutter position in which the valve is open. Control port 36 now constitutes an outlet, rather than an inlet as in FIGS. 1-4, and is connected to a line 39' leading to a nonillustrated ancillary valve which could be controlled by a float, by a solenoid or in some other manner. A disk 65' underlying the membrane 13 in this instance has several bottom grooves 165 maintaining compartment 15 in communication with bore 16 even with that disk resting on the floor of that compartment, as shown. With port 36 open to the atmosphere, or to some other region of relatively low pressure, a small part of the fluid entering channel 67 via port 122 passes through compartment 15 to port 36 via the restricted clearance 55 without raising the membrane 13 from its seat. When, however, the outflow of port 36 is cut off or severely throttled by the ancillary valve in line 39', the pressure differential existing across shutter assembly 121-125 begins to repress the membrane against the biasing force of spring 11, thereby moving the slide 121 toward its blocking position with resulting progressive increase in that pressure differential until the valve 100' is completely closed. When compartment 15 is again vented to low pressure, the illustrated unblocking position is restored.

The ancillary valve in line 39' may be of the pressure-sensitive type with a control inlet connected to exit port 133, for example, in order to close the valve 100' when its outlet pressure becomes excessive; such an ancillary valve could be similar to the valve 100 of FIG. 2, for example, except that its shutter assembly would be in its unblocking position (corresponding to that of assembly 121-125 in FIG. 6) when the pressure at its control inlet is low. The combination of valve 100' with such an ancillary valve would therefore operate as a fluid-pressure regulator.

The provision of a calibrated bushing 54 in the bore 16 of valve body 101 is advantageous since it enables a possible replacement in the event of wear or if its internal diameter has to be changed for any reason. In principle, however, the restricted passage 55 around rod 117 could also be produced by machining an integral part of that body.

Figure 7:
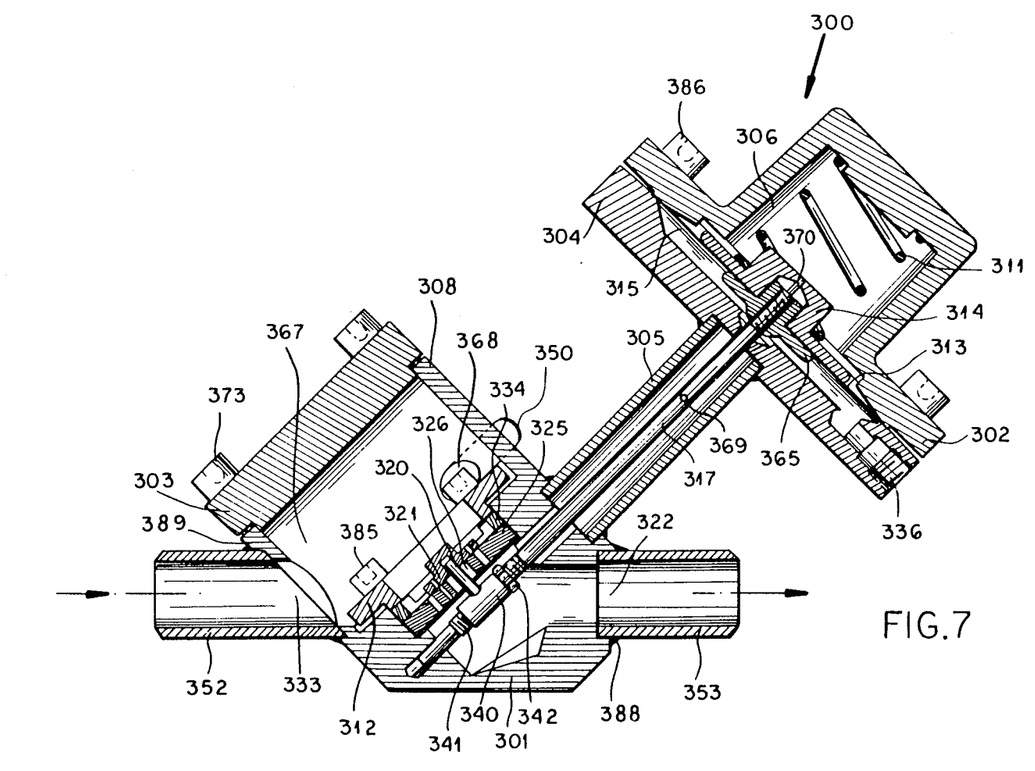
FIG. 7 is a sectional view of a flow-regulating valve similar to that of FIG. 3 but embodying a further improvement.

In FIG. 7, which shows another flow-regulating valve 300, elements functionally equivalent to those of FIGS. 2-4 have been designated by the same reference numerals preceded by a "3" in the position of the hundreds digit. The valve housing again comprises a lower body 301 and an upper body 302, the two bodies being rigidly interconnected by a tube 305 forming part of a passage for the guidance of a rod 317 which is positively coupled with a movable shutter plate or slide 321 contacting a fixed backing plate 325. The coupling between slide 321 and rod 317 comprises, as in the preceding embodiments, a pin 320 passing with clearance through a guide slot 326 of plate 325. The latter plate is held onto a seat in valve body 301, surrounding the flow channel 367, by a square frame 312 through the intermediary of a spacing frame 334. Frame 312 is attached to body 301 by four bolts 385 (only two shown) at the corners thereof, the heads of these bolts having polygonal bores engageable by an Allen wrench. Pin 320 is rigid with a sleeve 340 matingly traversed by a threaded part 341 of rod 317 and fixed in position by a nut 342, this adjustable type of coupling is, of course, also suitable for the rods and slides of the other embodiments.

Entrance port 333 and exit port 322 are defined by two nipples 352, 353 which are welded to valve body 301 at 389, 388, respectively, and are part of the high-pressure fluid line 52 and the low-pressure fluid line 53 seen in FIG. 1. These lines may further be formed by conduits welded to nipples 352 and 353, as known per se from the Parker-Hannifin brochure R/S 11582 referred to above. The part of flow channel 367 located between port 333 and the seat of shutter plate 325 lies within a housing neck 308 in the form of a prismatic, four-sided tube whose axis, perpendicular to rod 317 and to the contact plane of plates 325 and 321, includes an acute angle with the common axis of nipples 352, 353. This angle, preferably, does not exceed 45° and may be made even smaller in order to minimize the deflection of the flow path. With a relatively high pressure differential across shutter 321, 325 due to the small cross-sections of the plate apertures, however, the added flow resistance caused by this deflection is rather insignificant; in a refrigeration system, for example, the liquid pressures at the entrance and exit sides of the shutter may be about 10 bars and 1 bar, respectively. Neck 308 terminates in an access opening normally overlain by a cover 303 removably attached thereto by four mounting bolts 373 (only two shown) whose heads, like those of bolts 385 and 74 (FIG. 5), are engageable by an Allen wrench.

Tube 305, surrounding the rod 317 over a large portion of its length, is welded onto a base 304 to which the housing part 302 is secured by similar bolts 386 to form a pressure compartment 315 separated by a membrane 313 from a chamber 306 containing a biasing spring 311. Membrane 313 carries a spring anchor 314 and a disk 363 threadedly connected with the tip of rod 317 which passes with small annular clearance through a bore of base 304; that clearance could be externally bounded by a calibrated insert, such as bushing 54 of FIGS. 2–4 and 6, and has an axial bore (similar to that shown at 69 in FIG. 3) terminating in a cross-bore within tube 305 as indicated at 369. A hollow extension 370 of rod 317 connects that bore with spring chamber 306 for maintaining the latter substantially at outlet pressure as noted in conjunction with FIG. 3.

Membrane 313 is deflectable by fluid pressure from the entrance side of valve body 301 which, in the present instance, is supplied from the interior of neck 308 through an outlet 368 and a conduit 350 (illustrated only in part) to a port 336 of base 304. The connection to port 336 includes a bypass line, indicated at 39 in FIGS. 1 and 3, separated from conduit 350 by an ancillary valve such as that shown at 200' in FIG. 3.

As will be readily apparent, the improved valve structure of FIG. 7 affords direct access to shutter 321, 325 without requiring any disassembly other than the removal of cover 303; a shut-off valve upstream of port 333, of course, ought to be closed before the cover is taken off.

Figure 8:
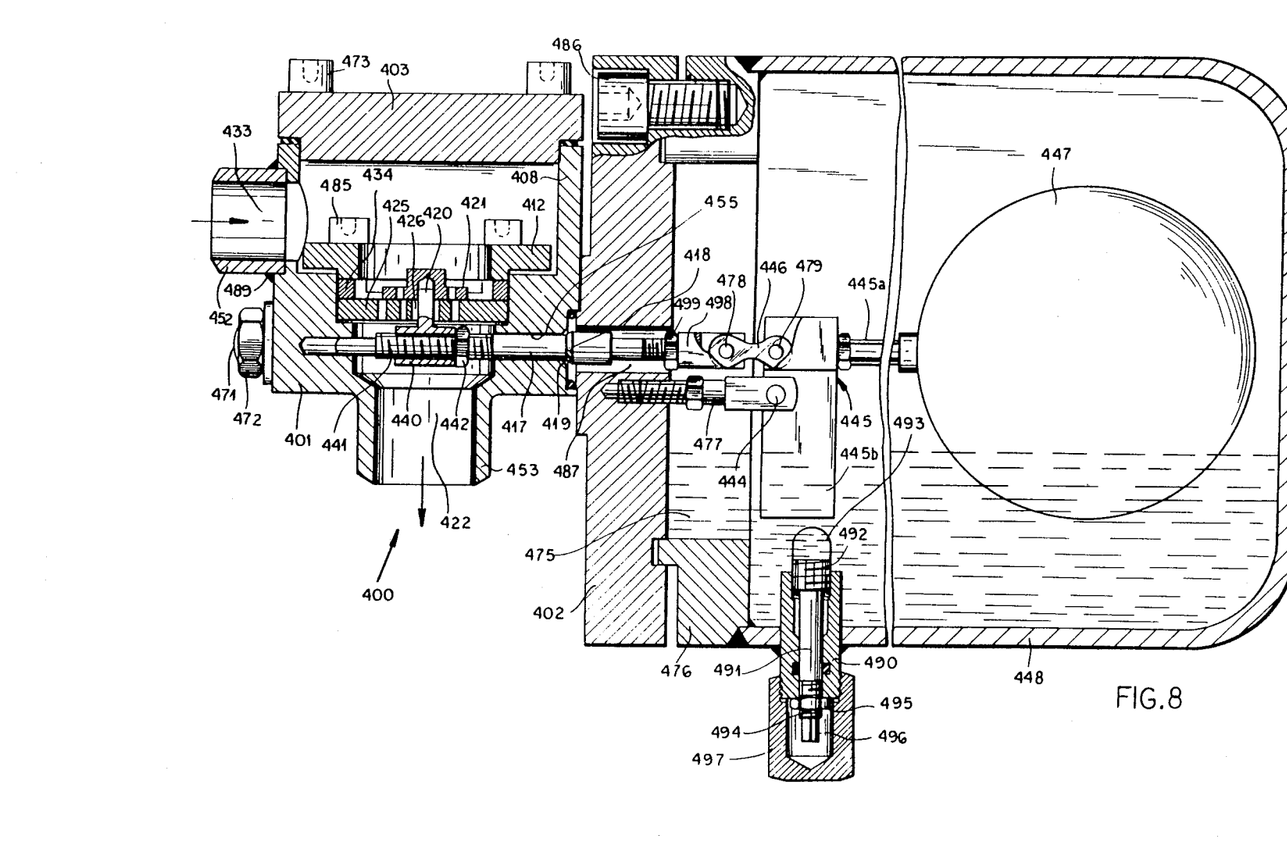
FIG. 8 is a view similar to that of FIG. 5 but embodying further improvements.

Reference will now be made to FIG. 8 which shows a pilot valve 400 associated with a tank 448 in an assembly generally similar to that of FIG. 5, with equivalent elements designated by like reference numerals having a "4" instead of a "2" in the position of their hundreds digit. Valve 400 differs from valve 200 of FIG. 5 in that its housing part 401, having an exit port 422 defined by a nipple 453, has an upstanding neck 408 (structurally similar to neck 308 of FIG. 7) which terminates in an access opening normally closed by a cover 403 with the aid of bolts 473. Valve body 401 accommodates a fixed aperture plate 425, held in position by a frame 412 via a spacer 434 with the aid of bolts 485, and an apertured slide 421, engaged by a pin 420 traversing a guide slot 426; this constitutes a valve assembly similar to those of the preceding Figures. Pin 420 is integral with an internally threaded sleeve 440 which mates with a threaded portion 441 of a connecting rod 417 and is immobilizable thereon by a nut 442, as described with reference to FIG. 7. In this instance, however, an entrance port 433 for fluid under pressure—e.g. a liquid refrigerant such as ammonia—adjoins the neck 408 laterally so that its axis parallels the horizontal contact plane of plates 421, 425 and also the connecting rod 417. Port 433 is defined by a nipple 452 which is welded to neck 408 at 489 and, like nipple 453 integral with body 401, can be welded to an adjoining conduit of a system carrying the liquid in a closed circuit including the tank 448 whose feed pipe and drain—indicated at 49 and 84 in FIG. 5—have not been illustrated.

Body 401 is secured by bolts 471 and nuts 472 to a housing part 402 which forms a lateral lid for tank 448 and has a channel 487 freely traversed by rod 417; the latter has another portion received with a sliding fit in a passage 455 of body 401. Passage 455 communicates, like its counterparts in FIGS. 2–5 and 7, with the low-pressure side of pilot valve 400. Since exit port 422 and the interior of tank 448 are assumed to be at approximately the same (usually about atmospheric) pressure, with the supply and drain pipes of the tank included in the same closed circuit as ports 422 and 433, any leakage through passage 455 during normal operation will be small and nonobjectionable. If, however, cover 403 is to be removed to give access to the shutter assembly, such leakage should be prevented when the circulating fluid is valuable and/or engenders noxious fumes upon exposure to the atmosphere. For this purpose I provide the rod 417 with a beveled shoulder 418 which seals the passage 455 upon coming to rest on a frustoconical seat 419 at the right-hand (tank-side) end of that passage when the rod 417 is shifted to the left into a limiting position by means about to be described.

The end of rod 417 remote from valve 400 is threadedly fitted into a bifurcate block 498 against which it is immobilized, in a suitable position of adjustment, by the tightening of a nut 499. Block 498 is articulated by a pintle 478 to a link 446 with two eyes, similar to link 46 of FIG. 5, which is further articulated by a pintle 479 to a substantially vertical arm 445b of an elbow-shaped lever 445 having a substantially horizontal arm 445a rigidly connected with a hollow ball 447 floating on the liquid pool in tank 448. Lever arm 445b is fulcrumed by a pin 444, defining a horizontal pivotal axis, on a bifurcate extremity of a bolt 477, all in a manner similar to the arrangement of FIG. 5.

A setting device, which is manually operable from without to drive the rod 417 into its sealing position, comprises a cylindrical sleeve 490 fixedly penetrating the bottom wall of tank 448 as a guide for a vertically movable thrust member 491 with upper threads 492 engaging the sleeve and lower threads 494 engaged by a nut 495 which immobilizes that member in a selected position of adjustment. A lower extremity of the rod-shaped thrust member 491, normally concealed within a cap 497, forms a polygonal stem which upon removal of that cap can be engaged by a socket wrench—after a loosening or removal of nut 495—to let the tip 493 of this member come into contact with the underside of lever arm 445b at a point horizontally offset from pivot pin 444 whereby lever 445 can be swung counterclockwise to shift the rod 417 into its left-hand limiting position. Shutter 421, 425 can then be accessed, after shutoff of the conduit feeding the entrance port 433, upon removal of the cover 403 for inspection or repair, if necessary.

In operation, with suitable adjustment of thrust member 491 to keep its tip 493 spaced from lever arm 445b when the liquid in tank 448 is at its normal level, that tip forms a bottom stop for the lever arm so as to define a right-hand limiting position for the displacement of connecting rod 417. The two limiting positions should be so chosen that pin 420 is prevented from actually contacting the edges of slot 426 in plate 425 in order to prevent any deformation of that plate which would impair the operation of valve 400. Similar stops can, of course, be readily provided for the connecting rods of the preceding Figures. Thus, thrust member 491 not only allows valve 400 to be fluidically isolated from tank 448, in an idle phase of the system, but also plays an active role under operating conditions, eliminating—together with shoulder or plug formation 418—the need for the stops 80 and 82 shown in FIG. 5.

I claim:

1. A flow-regulating valve comprising:
a valve body provided with an entrance port and an exit port interconnected by a channel;
shutter means in said channel including an apertured slide, movable between a blocking position and an unblocking position, and an apertured plate adjoining said slide in a contact plane which includes an angle significantly different from 90° with an axis of at least one of said ports, said plate being removably mounted in a seat of said body open toward said one of said ports, said body being further provided with a restricted passage extending parallel to said contact plane to a remote space from a location in said channel lying between the other of said ports and said shutter means;
control means including a stem disposed in said remote space;
a rod extending into said passage and connecting said stem with said slide for selectively shifting same between said positions in response to an external actuating force, said body having an access opening offset from said one of said ports and substantially parallel to said contact plane and said stem confronting the open side of said seat and enabling extraction of said slide and plate from said rod individually or as a single unit without disturbing any other components of the valve; and
removable cover means sealing said access opening.

2. A flow-regulating valve as defined in claim 1 wherein said remote space forms a pressure compartment communicating with a further port, said control means comprising a membrane overlying said pressure compartment and engaging said rod, said membrane being provided with biasing means resisting a displacement thereof by fluid under pressure admitted into said compartment through said further port, said location lying downstream of said shutter means.

3. A flow-regulating valve as defined in claim 2 wherein said pressure compartment communicates with said channel in said unblocking position through an annular clearance separating said rod from a wall surface closely surrounding same in said passage.

4. A flow-regulating valve as defined in claim 3 wherein said rod is provided with plug means obstructing said clearance in said blocking position.

5. In combination, a flow-regulating valve as defined in claim 3 and an ancillary valve inserted into a bypass path between said entrance port and said further port for selectively admitting incoming fluid under pressure to said further port.

6. The combination defined in claim 5 wherein said body is a housing with a tubular neck extending from said neck to said access opening and having an axis substantially perpendicular to said contact plane, said neck having an outlet fluidically connected with said further port.

7. A flow-regulating valve as defined in claim 6 wherein said ports are substantially aligned with each other along a common axis including an acute angle with said contact plane.

8. A flow-regulating valve as defined in claim 1 wherein said slide confronts said access opening.

9. A flow-regulating valve as defined in claim 8 wherein said slide lies on the side of said plate facing said entrance port.

10. A flow-regulating valve as defined in claim 1 wherein said control means comprises a float dipping into a pool of liquid within a tank supplied with said liquid by way of said channel and said exit port, said slide being movable by said float into said unblocking position upon the liquid in said pool dropping below a predetermined level.

11. A flow-regulating valve as defined in claim 10 wherein said contact plane is substantially horizontal, said body having a tubular neck which rises above said seat and terminates in said access opening, one of said ports entering said neck laterally above said shutter means, the other of said ports entering said body below said shutter means.

12. A flow-regulating valve as defined in claim 10 wherein said rod is provided with passage-obstructing means sealing said channel against said tank in a limiting position, said tank being provided with setting means operable from the outside for displacing said rod together with said slide into said limiting position independently of the liquid level in said pool.

13. A system as defined in claim 12 wherein said float is coupled with said slide by a lever articulated to said rod and swingable about a horizontal pivotal axis in said tank, said setting means being juxtaposed with said lever for displacing same independently of the liquid level in said pool.

14. A system as defined in claim 13 wherein said lever has a first arm rigid with said float and a second arm fulcrumed on said pivotal axis, said setting means comprising a thrust member displaceable along a line skew to said pivotal axis into contact with one of the arms of said lever.

15. A system as defined in claim 14 wherein said thrust member is slidable into contact with said second arm.

16. A system as defined in claim 14 wherein said thrust member is normally immobilized to define another limiting position for said rod.

17. A system as defined in claim 16 wherein said rod is substantially horizontal and is coupled with said second arm by a double-jointed link, said second arm being generally vertical in a swing range bounded by said limiting positions.

18. A flow-regulating valve as defined in claim 1 wherein said ports are formed by nipples welded onto said body.

* * * * *